United States Patent [19]
Mergard

[11] Patent Number: 5,881,248
[45] Date of Patent: Mar. 9, 1999

[54] SYSTEM AND METHOD FOR OPTIMIZING SYSTEM BUS BANDWIDTH IN AN EMBEDDED COMMUNICATION SYSTEM

[75] Inventor: James Mergard, Pflugerville, Tex.

[73] Assignee: Advanced Micro Devices, Inc., Sunnyvale, Calif.

[21] Appl. No.: 812,218

[22] Filed: Mar. 6, 1997

[51] Int. Cl.$^6$ ...................................................... G06F 13/00
[52] U.S. Cl. ........................... 395/280; 395/842; 395/308
[58] Field of Search ..................................... 395/280, 308, 395/842, 293, 860, 737; 711/154

[56] References Cited

U.S. PATENT DOCUMENTS

| | | | |
|---|---|---|---|
| 5,392,404 | 2/1995 | Thompson | 395/860 |
| 5,544,346 | 8/1996 | Amini et al. | 711/154 |

Primary Examiner—Meng-Ai T. An
Assistant Examiner—Rupal D. Dharia
Attorney, Agent, or Firm—Conley, Rose & Tayon; Jeffrey C. Hood

[57] ABSTRACT

A communication system which includes more efficient bus utilization for higher data throughput. The communication system includes various logic devices connected to a system bus. The communication system intelligently utilizes unused system bus bandwidth for improved performance. The communication system includes a receive buffer, a memory, a central processing unit (CPU), a direct memory access (DMA) controller, and a bus arbiter each preferably coupled to the system bus. The buffer is operable to generate a low priority DMA transfer request when any amount of data is stored in the buffer. The buffer is also operable to generate a high priority DMA transfer request when a certain threshold or amount of data is stored in the buffer, i.e., when a certain "water-level" has been reached. When the buffer generates the low priority DMA request, the DMA controller and/or bus determine if the system bus is otherwise not being utilized, e.g., if the CPU is currently operating out of its cache system and no other devices have requested or are using the bus. If so, the DMA transfers are allowed to proceed. The high priority DMA transfer request operates normally, guaranteeing access to the system bus to avoid FIFO overruns.

22 Claims, 11 Drawing Sheets

SYSTEM AND METHOD FOR OPTIMIZING SYSTEM BUS BANDWIDTH IN AN EMBEDDED COMMUNICATION SYSTEM

FIELD OF THE INVENTION

The present invention relates to communication systems architectures, and more particularly to a communication system architecture which allows DMA transfers to occur during unused bandwidth portions of a bus, thus providing more efficient bus utilization.

DESCRIPTION OF THE RELATED ART

In today's information-based society, many individuals desire remote data connectivity or improved communications. In general, personal computers and LANs facilitate remote access to computing resources. Remote connectivity is also made possible with the arrival of affordable, reliable, digital telecommunication services and inexpensive network hardware. Currently, a variety of digital telecommunication services now support remote connections to enterprise networks, among these being Frame Relay, ISDN, ATM, Digital Data Service, and T1, among others.

Communication systems are also being required to handle increasingly large amounts of data. Modem communication systems are many times required to accommodate integrated services, such as voice, data and video, on a single communication medium. Thus, certain of the data provided through a communication system has isochronous or real-time requirements. The communication system is correspondingly required to maintain a desired level of throughput or data transfer in order to guarantee real-time delivery of, for example, audio or video data.

As with computer systems, communication systems generally comprise various logic components connected by one or more system buses. The one or more buses provide a transfer path for control and data information between each of the logical components. In many systems, the system bus becomes a bottleneck for the transfer of data between the various logic components. Therefore, an improved system and method is desired which provides more efficient bus utilization for increased data throughput in a communication system.

SUMMARY OF THE INVENTION

The present invention comprises a communication system which includes more efficient bus utilization for higher data throughput. The communication system includes various logic devices connected to a system bus. The communication system intelligently utilizes unused system bus bandwidth for improved performance.

The communication system includes a receive buffer, a memory, a central processing unit (CPU), a direct memory access (DMA) controller, and a bus arbiter each preferably coupled to the system bus. The central processing unit is coupled to the bus and is operable to perform transfers on the bus. The CPU generates a bus request signal onto the system bus to request use of the bus. A cache system is coupled between the central processing unit and the system bus and stores frequently used code and data used by the CPU. When the CPU is able to retrieve data from the cache system, the CPU is not required to access the system bus.

As noted above, the system further includes a buffer which stores received data and a direct memory access (DMA) controller. The DMA controller controls direct memory access transfers on the system bus between a requesting device and the memory. According to the preferred embodiment of the invention, the buffer is operable to generate a low priority DMA transfer request when any amount of data is stored in the buffer. The buffer is also operable to generate a high priority DMA transfer request when a certain threshold or amount of data is stored in the buffer, i.e., when a certain "water-level" has been reached.

The communication system also includes a bus arbiter coupled to the DMA controller which arbitrates between requesting devices for control of the system bus. The DMA controller forwards DMA transfer requests to the bus arbiter, which then allocates control of the bus according to a desired arbitration scheme.

When the buffer generates a low priority DMA request, the DMA controller and/or bus arbiter examine the bus request signal of the CPU to determine if the CPU is currently using the system bus or operating out of its cache system. If the bus request signal indicates that the CPU is not currently using the system bus, and no other devices are using the bus and/or have pending requests, the DMA controller performs DMA transfers between the buffer and the memory. If the bus request signal indicates that the CPU is currently using the system bus, then the low priority DMA transfer request is ignored. Likewise, if another device has been granted control of the system bus and/or the bus arbiter has pending requests, then the low priority DMA request it ignored.

When the buffer generates the high priority DMA transfer request, indicating that the buffer has stored an amount of data over a certain threshold, then the bus arbiter grants priority to the DMA controller. Thus, when the high priority DMA transfer request is received, the bus arbiter grants the bus to the DMA controller, enabling the DMA controller to perform transfers between the buffer and the memory.

Therefore, the communication system of the present invention allows the DMA controller to perform transfer from the buffer to the memory during idle periods when the CPU is operating out of its cache system. This provides increased bus utilization over prior designs. When the amount of data stored in the buffer rises above a critical threshold, the high priority DMA transfer request guarantees use of the bus for DMA transfers, thus preventing FIFO overruns.

In one embodiment, the CPU bus interface unit (BIU) includes logic which predicts potential CPU usage to avoid race conditions between the CPU and external data being provided to the communication system. In this embodiment, the BIU logic stores a value which indicates the period of time during which the CPU is predicted to be on/off the system bus. The value is generated based on various factors, including the cache hit rate, the instructions currently in the CPU's pipeline, and whether the data required in subsequent cycles will likely involve cache hits. This value is read and used by the DMA controller and/or bus arbiter to enable DMA transfers to be performed during bus idle periods.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
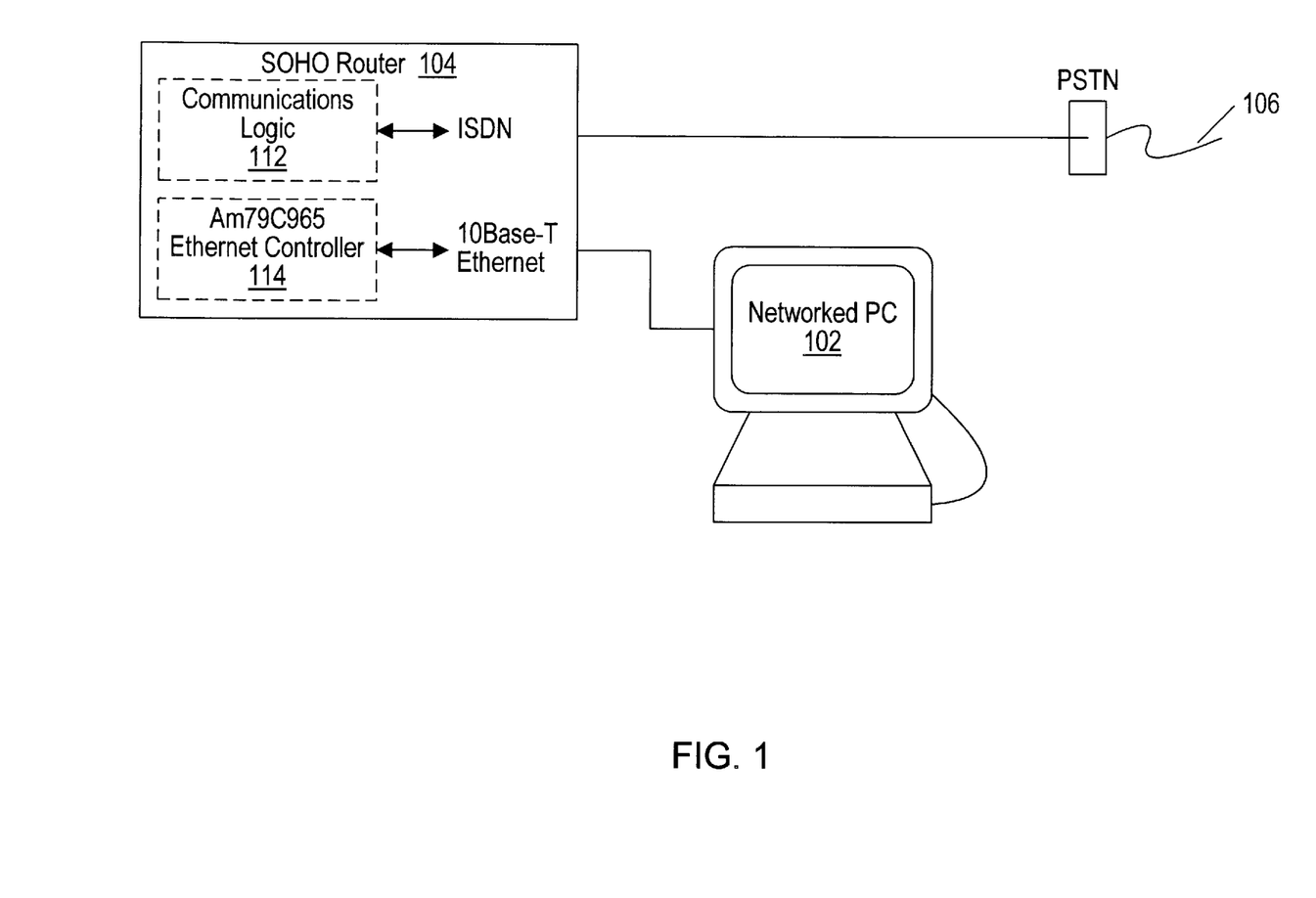
FIG. 1 illustrates a router which interfaces between a local area network and the PSTN and which includes improved bus utilization according to the present invention.

FIG. 1-Communication System

Referring now to FIG. 1, a communication system which incorporates the preferred embodiment of the present invention is shown. FIG. 1 illustrates a router 104 which connects to one or more networked computer systems 102 and which is operable to connect to the public switched telephone network (PSTN) 106. The router 104 includes communication logic 112 which provides more efficient bus utilization according to the present invention. However, it is noted that the present invention may be comprised in other types of communication devices or computer systems, as desired.

As shown, the router 104 interfaces to at least one computer system 102, preferably a networked computer system 102. The networked computer system 102 may be part of a local area network (LAN). The router 104 may be configured to interface to any of various types of computer systems or networks. Thus one or more of the networked computer systems 102 connect through the router 104 to the public switched telephone network (PSTN) 106.

The router 104 operates to route messages across different networks with different topologies. Router 104 also preferably performs gateway functions, i.e., the router includes hardware and/or executes software for translating between different protocols. Thus, the router/gateway 104 can provide a link between a local area network represented by networked PC 102, and a completely different network type using a different transfer protocol. This enables, for example, a LAN to connect to a mainframe. More specifically, this allows a Novell network using NETBEUI to interface to a TCP/IP network, such as a Unix network or the Internet. It is noted that a router operates at the lower three layers of the OSI (open systems interconnection) model, whereas a gateway operates at all layers of the OSI model.

The router 104 may be adapted for connecting to various types of communication media. In the embodiment of FIG. 1, the router connects through the PSTN 106, wherein the PSTN may be standard plain old telephone service (POTS) or the ISDN (integrated services digital network). The router 104 may also be adapted to couple to an ATM (asynchronous transfer mode) network, an FDDI (fiber distributed data interface) network, an X.25 network, a synchronous optical network (SONET), ADSL (Assymetric Digital Subscriber Line), or other types of communication protocols or media, as desired.

As shown, the router 104 includes communication logic 112. In the preferred embodiment the communication logic 112 presents an ISDN interface for coupling to the PSTN 106. As mentioned above, the communication logic 112 includes logic for providing more efficient bus utilization according to the present invention.

The router 104 also preferably includes an Ethernet controller 114 for coupling to an Ethernet local area network (LAN). Each of the Ethernet controller 114 and the communication logic 112 include provisions for dumping packets to common memory, and obtaining packets from memory. The Ethernet controller 114 and the communication logic 112 are thus coupled through the protocol conversion functions of the system. The Ethernet controller 114 couples through a communication media to the local area network, represented by networked computer system 102. In the preferred embodiment, the Ethernet controller 114 is adapted to provide a 10Base-T Ethernet connection.

Figure 2:
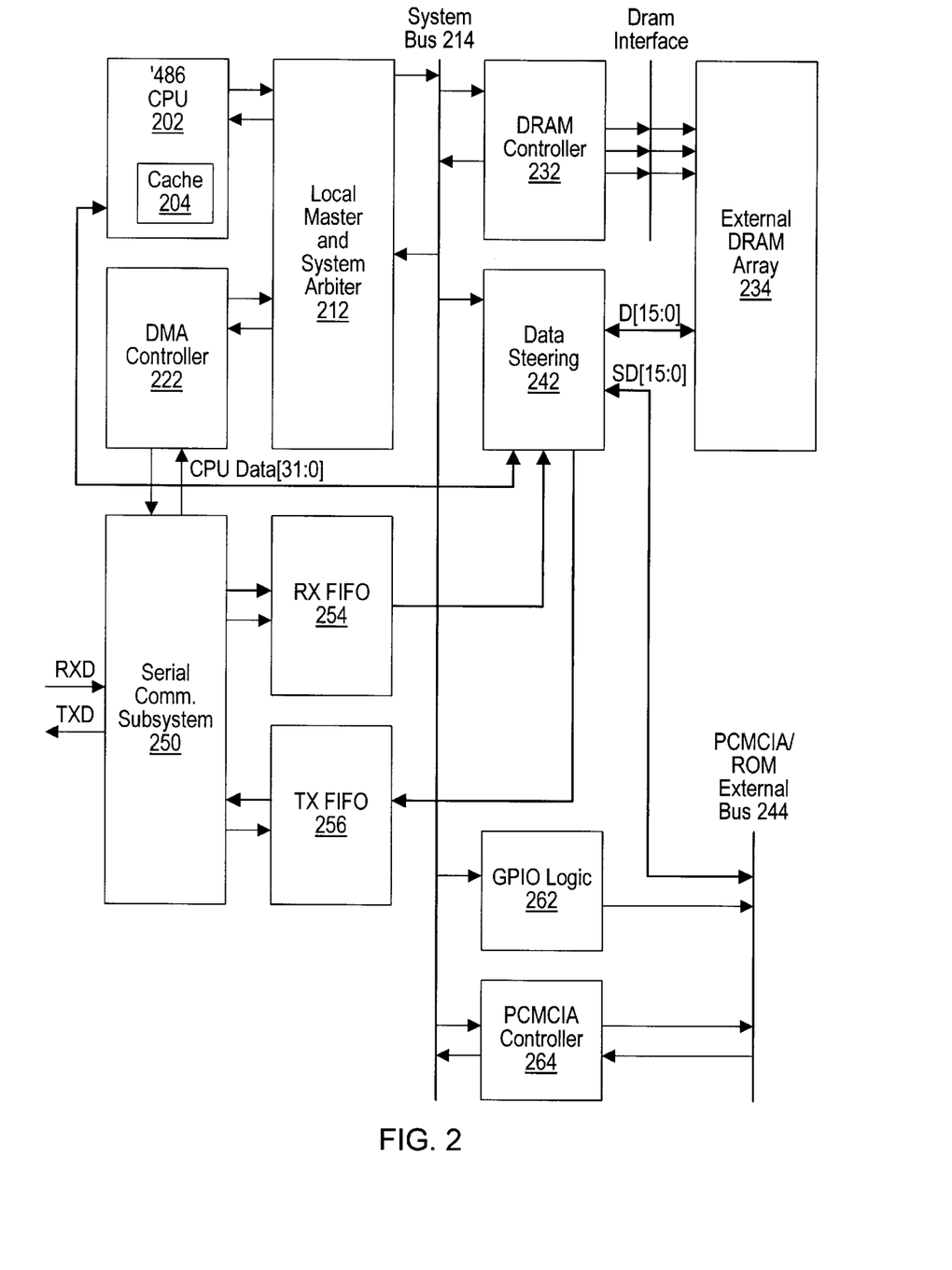
FIG. 2 is a block diagram of communication logic comprised in the router of FIG. 1.

FIG. 2-Communication Logic

Referring now to FIG. 2, a block diagram which illustrates the architecture of the communication logic 112 according to one embodiment of the present invention is shown. The communication logic 112 preferably comprises an embedded communication processing system. The communication logic 112 includes a system and method for performing data transfers with more efficient bus utilization according to the present invention.

As shown, the communication logic 112 includes a central processing unit 202. The central processing unit 202 preferably includes an internal or external cache system. In the embodiment shown in FIG. 2, the CPU 202 includes an internal or on-chip cache system 204 as shown. In the preferred embodiment, the CPU 202 is a 486 compatible microprocessor such as the AM486 produced by Advanced Micro Devices. Other types of CPUs 202 which include either an internal and/or external cache system may be used as desired.

As shown, the CPU 202 couples to Local Master and System Arbiter logic 212. The Local Master and System Arbiter 212 couples to an internal bus 214, referred herein as the "internal bus" or system bus 214. The Local Master and System Arbiter block 212 performs arbitration functions for controlling accessing to the system bus 214. The Local Master and System Arbiter logic 212 also performs bus mastering functions.

A direct memory access (DMA) controller 222 is coupled to the Local Master and System Arbiter logic 212. The DMA controller 222 performs direct memory access operations. Thus, the DMA controller 222 operates through the local master 212 to perform transfers between devices on the system bus 214 without requiring host CPU intervention, i.e., without requiring transfer or set-up operations to be performed by the CPU 202.

The communication logic 112 also preferably includes a memory controller 232 which couples to the system bus 214. The memory controller 232 comprised in the communication logic 112 is adapted for coupling to a memory array 234. As shown, the memory array 234 is preferably a dynamic random access memory (DRAM) memory array. Also, the memory controller 232 is preferably a DRAM controller as shown.

A data steering logic block 242 is also coupled to the system bus 214. The data steering logic 242 couples to a PCMCIA/ROM external bus 244. The external bus 244 provides an interface for PC cards which are compatible with the personal computer memory card internal association (PCMCIA) standard. External bus 244 also provides an interface for ROM (read only memory) as well as other devices. The data steering logic 242 also couples through a data path to the external DRAM array 234. The data steering logic 242 further couples to the CPU 202, as well as to a receive FIFO device (RX FIFO) 254 and a transmit FIFO device (TX FIFO) 256.

The data steering logic 242 operates to provide data manipulation functions and data path transfers to allow each of the devices comprised in the communication system to operate using a single external memory array 234. For more information on the data steering logic 242, please see U.S. patent application Ser. No. 08/837,120, entitled "A Shared Memory Architecture in a Single Chip for a Low-Cost Hand-Held PC Applications," filed Apr. 14, 1997 (TT1295/AMD5000-67100), whose inventor is James Mergard, et al. which is hereby incorporated by reference in its entirety.

The communication system includes a serial communication subsystem 250. The serial communication subsystem 250 provides a serial communication interface to external communication media. As discussed above, in the preferred embodiment the router 104 provides an ISDN interface through the PSTN 106. Thus, the serial communication subsystem 250 preferably provides a serial interface for PSTN connectivity. As shown, the serial communication subsystem 250 includes a receive data input (RXD) and a transfer data output (TXD). The serial communication subsystem is coupled to provide receive data to the receive FIFO 254. The receive FIFO 254 in turn provides data to the data steering logic 242. The serial communication subsystem 250 is also coupled to receive data from the transmit FIFO 256. The transmit FIFO 256 is in turn coupled to receive data from the data steering logic 242. In an alternate embodiment, the receive FIFO 254 and transmit FIFO 256 may be coupled directly to the system bus 214.

As shown, the communication system 112 preferably includes general purpose input/output logic (GPIO logic) 262 which couples to the system bus 214, and which also couples to the PCMCIA/ROM External bus 244. The GPIO logic 262 provides general purpose input/output operations between the external bus 244 and the internal bus 214. The system further includes a PCMCIA controller 264 which is also coupled between the system bus 214 and the PCMCIA external bus 244. The PCMCIA controller 264 provides a PCMCIA standard interface for PC card devices.

Figure 3:
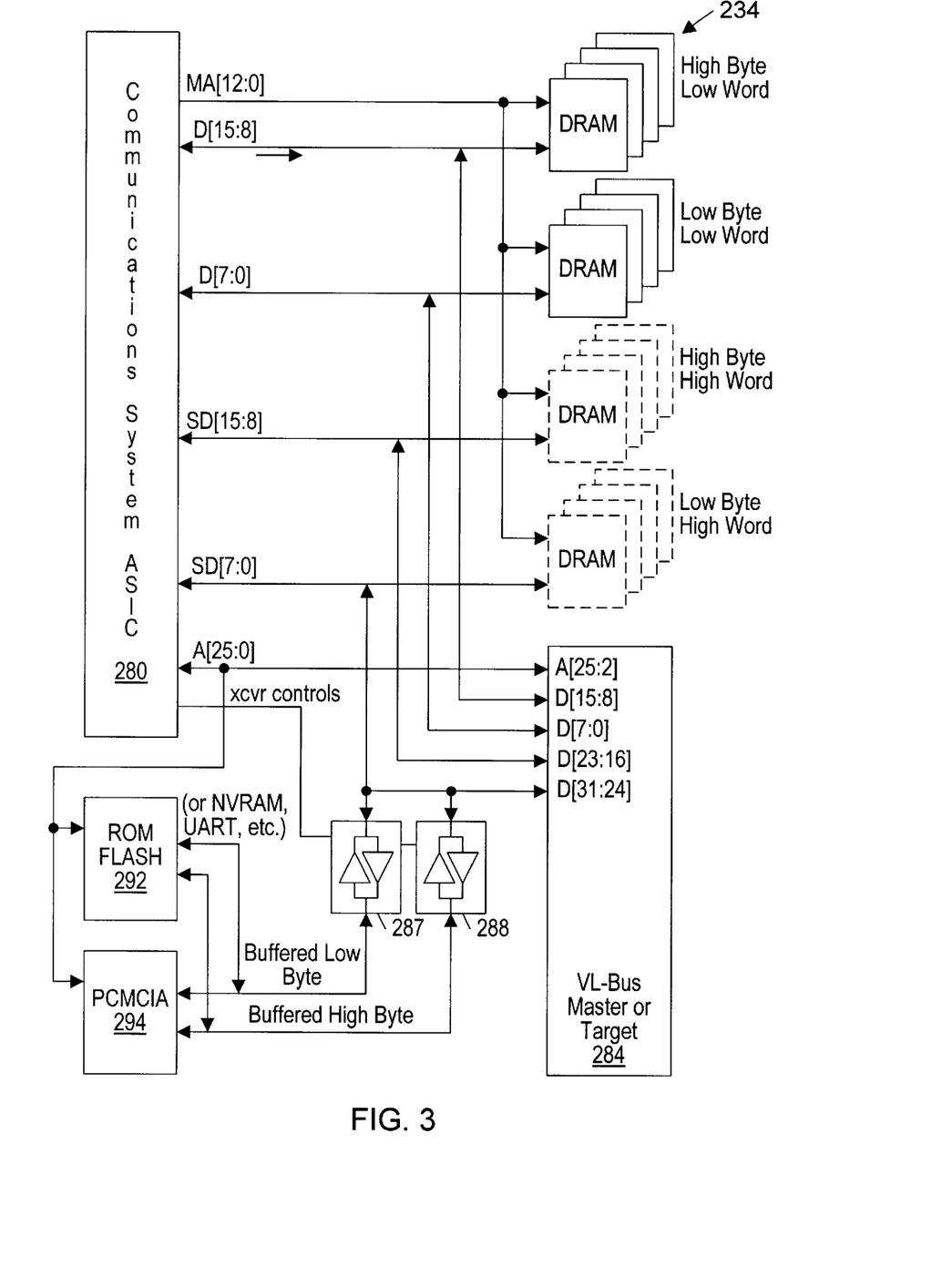
FIG. 3 illustrates the address/data path configuration of the communication system of FIG. 2.
Figure 4:
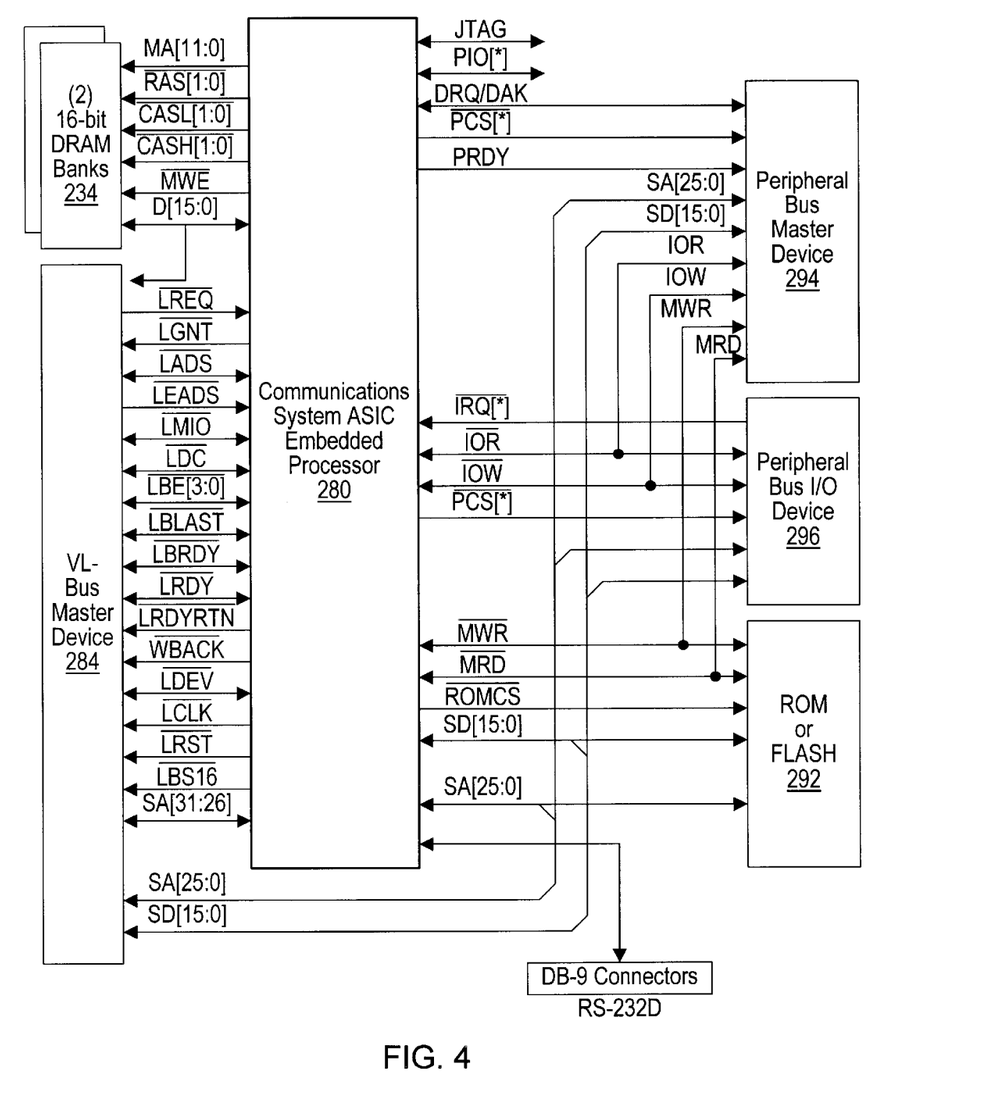
FIG. 4 is a block diagram of the logic devices comprised in the communication system of FIG. 2.

FIGS. 3 and 4-External Address/Data Bus and Control Signal Interface

FIG. 3 illustrates the communication system 112 partitioned according to the various discrete blocks according to the preferred embodiment. As shown, the communication system 112 preferably comprises a system ASIC (application specific integrated circuit) 280. The system ASIC 280 preferably incorporates the CPU 202, the DMA controller 222, the Local Master and System Arbiter logic 212, the system bus 214, the DRAM controller 232, the data steering logic 242, the receive and transmit FIFOs 254 and 256, the serial communication subsystem 250, the GPIO logic 262 and the PCMCIA controller 264. It is noted that the system of FIG. 2 may be implemented in various other ways, such as a plurality of discrete logic blocks or programmable logic, as desired.

As shown, the system ASIC 280 provides various address and data interfaces to the external DRAM array 234. In the embodiment of FIG. 3, the external DRAM array 234 comprises four banks of DRAM memories as shown. These four banks preferably comprise a high byte low word bank, a low byte low word bank, a high byte high word bank, and a low byte high word bank. It is noted that various other types of memory array configurations may be used as desired.

The system ASIC 280 preferably includes a system bus interface for external devices. As shown, the bus master or target device 284 may be coupled to the system ASIC 280. The bus master or target device 284 couples directly to the internal system bus 214 comprised in the communication logic 112. In the preferred embodiment shown in FIG. 1, the bus master or target device 284 comprises the Ethernet controller 114. FIG. 3 also illustrates bus transceivers 287 and 288, which provide the PCMCIA/ROM external bus interface 244. As shown, the external bus 244 is adapted for coupling to a ROM/Flash memory array 292 as well as PCMCIA interface logic 294. Various other devices may be connected to the external bus 244, including non-volatile random access memory (NVRAM) and a universal asynchronous receiver transmitter (UART) (both not shown), among others.

FIG. 4 is a block diagram similar to FIG. 3 which shows the various control signals provided each of the various logic devices of FIG. 3. Thus, FIG. 4 illustrates the system ASIC or embedded processor 280 coupled to the external memory 234, the master device 284, ROM/Flash memory 292, PCMCIA bus master device 294, and peripheral bus I/O device 296. The peripheral bus I/O device 296 may be a universal asynchronous receiver transmitter (UART) or other device. FIG. 4 also illustrates a serial interface provided by the system ASIC or embedded processor 280 as shown.

OPERATION OF THE PRESENT INVENTION

Referring again to FIG. 2, a communication system for optimizing bus bandwidth according to the present invention comprises the system bus 214 for transferring data and the central processing unit (CPU) 202 coupled to the system bus 214. The CPU 202 is operable to perform transfers on the system bus 214. The CPU is operable to generate a bus request signal onto the system bus 214 to request use of the system bus 214. The bus request signal is preferably the 486 BREQ signal. The bus request signal has a first state which indicates a request for use of the system bus 214, and a second state which indicates no request for use of the system bus 214. The system also includes system memory 234 coupled to the system bus 214.

The CPU 202 also includes the cache system 204. The cache system 204 stores code and/or data which is usable by the CPU 202. As discussed above, when the CPU 202 is executing out of the cache system 204, the CPU 202 is not required to access the system bus 214. The CPU 202 is thus operable to retrieve data from the cache system 204 without requiring access to the system bus 214. The bus request signal has the second state while the CPU 202 is retrieving data from the cache system 204.

Figure 5A:
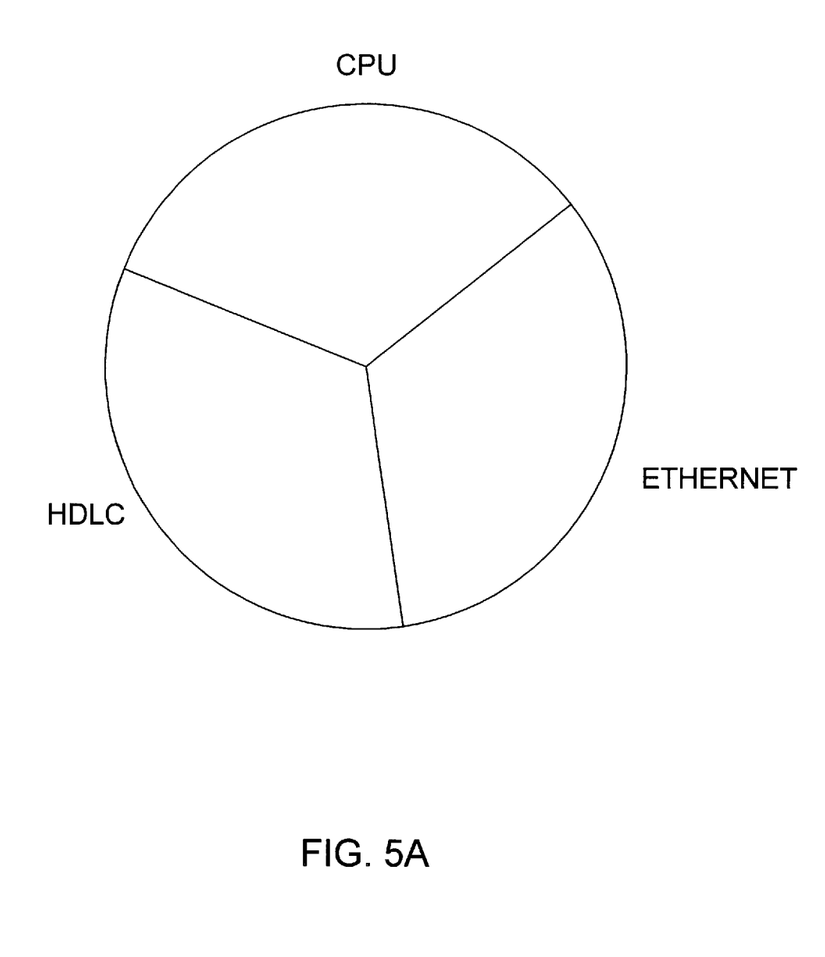
FIGS. 5A and B illustrate pical bus utilization of the system bus.
Figure 5B:
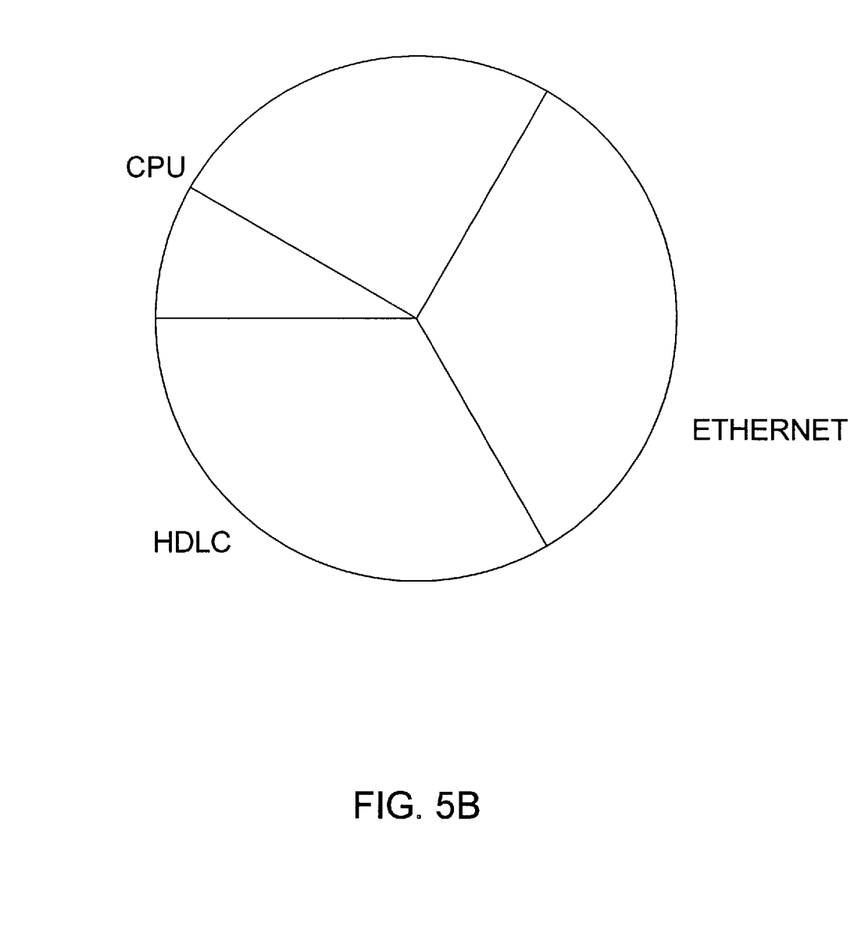

FIG. 5A illustrates typical bus bandwidth utilization by different masters in a communication system. FIG. 5B illustrates the bus bandwidth actually used in a prior art system. The shaded area in FIG. 5B is actually unused because, by default, this bandwidth is dedicated to the CPU, and the CPU is operating from the cache system during this time. During the time the CPU is operating from the cache system, DMA transfers generally do not occur because the FIFO data threshold or water level has not been reached. The system and method of the present invention optimally uses this previously unused bandwidth to provide increased system efficiency.

Referring again to FIG. 2, the communication system 112 includes a buffer, such as the RX FIFO 254, which couples to the system memory 234. In the embodiment of FIG. 2, the buffer 254 couples through the data steering logic 242 to the system memory 234. According to the present invention, the buffer 254 is operable to generate a low priority DMA transfer request when any amount of data is stored in the buffer 254. Thus, whenever the buffer 254 receives any amount of data, the buffer 254 generates the low priority DMA transfer request. As discussed below, the low priority DMA transfer request is serviced substantially only during instances when the system bus 214 would otherwise be idle.

The buffer 254 is also operable to generate a high priority DMA transfer request when a first amount of data is stored in the buffer. In other words, the buffer 254 is operable to generate a high priority DMA transfer request when the amount of data stored in the buffer 254 exceeds a preset threshold. For example, in one embodiment, when the buffer 254 is over 80% fill, the buffer 254 generates the high priority DMA transfer request. The high priority DMA transfer request has a higher priority to prevent overflow errors from occurring in the buffer 254. When the DMA controller 222 is operating in block mode, the low priority DMA transfer requests are inactive to prevent FIFO underruns.

The direct memory access (DMA) controller 222 is operable to perform DMA transfers on the system bus 214 between a requesting device and the memory 234. The DMA controller 222 performs the DMA transfers in response to DMA transfer requests from requesting devices. The DMA controller 222 preferably includes a first input which receives the low priority DMA transfer request and a second input which receives the high priority DMA transfer request. When the low priority DMA transfer request is received, the DMA controller 222 is operable to initiate a DMA transfer request only if the CPU bus request signal is in the second state, i.e., the CPU 202 is operating out of its cache 202, and the bus 214 is otherwise not being utilized, i.e., the system bus 214 is not currently busy with data transfers and/or there are no pending requests. In the preferred embodiment, the DMA controller 222 is also configured to not perform DMA transfers when the low priority DMA transfer request is received if there are pending requests for the bus by other masters. When the high priority DMA transfer request is received, the DMA controller 222 is operable to initiate a DMA transfer request.

As mentioned above, the communication system also includes the bus arbiter 212. The bus arbiter 212 is operable to control access to the system bus 214. In the preferred embodiment, the DMA controller 222 is configured to provide the low priority DMA transfer request and the high priority DMA transfer request to the bus arbiter 212. Thus when the DMA controller 222 receives the low priority DMA transfer request from the buffer 254, the DMA controller 222 preferably provides the request to the bus arbiter 212. The bus arbiter 212 acknowledges the low priority DMA transfer request and grants control of the bus 214 preferably only when no other requests are pending and the CPU 202 is not currently using the system bus 214, indicated by the bus request signal being in the second state. Thus when the bus arbiter 212 receives the low priority DMA transfer request, the bus arbiter 212 is operable to grant control of the system bus 214 for a DMA transfer when the low priority DMA transfer request is received only if the bus request signal is in the second state, indicating that the CPU 202 is not currently using the bus 214, and the arbiter 212 does not currently have pending requests and/or is not currently busy with data transfers.

If the bus arbiter 212 receives a higher priority request from another device prior to or immediately after the low priority DMA transfer request is received, but before the DMA transfer is initiated, the bus arbiter 212 is operable to generate a signal indicating a request for the system bus 214. The DMA controller 222 is configured to not perform DMA transfers when the low priority DMA transfer request is received if the bus arbiter 212 generates the signal indicating a request for the system bus 214 by another device.

When the bus arbiter 212 receives the high priority DMA transfer request from the DMA controller 222, the bus arbiter 212 is operable to grant control of the system bus 214 for a DMA transfer regardless of other requests and/or CPU usage of the bus. This is necessary to prevent FIFO overflow.

In the embodiment of FIG. 2, the buffer 254 which generates low priority and high priority DMA transfer requests is a receive buffer for storing received communication data. In an alternate embodiment, the buffer 254 is an Ethernet buffer for storing Ethernet data. The buffer which generates the low priority and high priority DMA transfer requests may be any of various types of memory devices, or other devices, as desired.

ALTERNATE EMBODIMENT

The central processing unit 202 includes a bus interface unit (BIU) which interfaces to the system bus 214. In one embodiment, the BIU includes logic which stores a value that indicates predicted future CPU usage or non-usage of the system bus 214. Thus in one embodiment the BIU stores a value which indicates a length of time during which the CPU 202 is predicted to not request the system bus 214. In this embodiment the DMA controller 222 is operable to read the value which indicates predicted future CPU usage of the system bus 214 prior to performing DMA transfers. The DMA controller 222 then performs DMA transfers for a length of time based on the read value. The DMA controller 222 is also preferably able to change this value in the BIU if the DMA controller 222 does not require the system bus 214 for this length of time. It is noted that this embodiment presumes that DMA transfers on the bus occur sufficiently fast and/or the CPU cache can predict bus non-usage sufficiently far in advance to allow one or more DMA bus transfers to occur during this period of predicted bus non-usage.

In this embodiment, the BIU logic stores a value which indicates the period of time during which the CPU is predicted to be on/off the system bus 214. The value is preferably generated based on various factors, including the cache hit rate, the instructions currently in the CPU's pipeline, and whether the data required in subsequent cycles will likely involve cache hits. Thus the CPU's pipeline logic and/or cache logic are configured to provide and indication of future cache hits. For example, after a cache miss when the cache performs a line fill to read a line of data from the memory into the cache, the probability of future cache hits is large. If the pipeline logic indicates that subsequent instructions will likely involve cache hits to this newly allocated data, then the BIU logic stores a value indicating that the CPU 202 will not require the bus for the next few cycles. This value is read and used by the DMA controller and/or bus arbiter to enable DMA transfers to be performed during this time.

In an alternate embodiment the BIU stores a value which indicates a length of time after which the CPU 202 will no longer be using the system bus 214. In this embodiment, the bus arbiter 212 uses this value to schedule low priority DMA transfer requests after the CPU no longer requires the system bus 214.

Figure 6A:
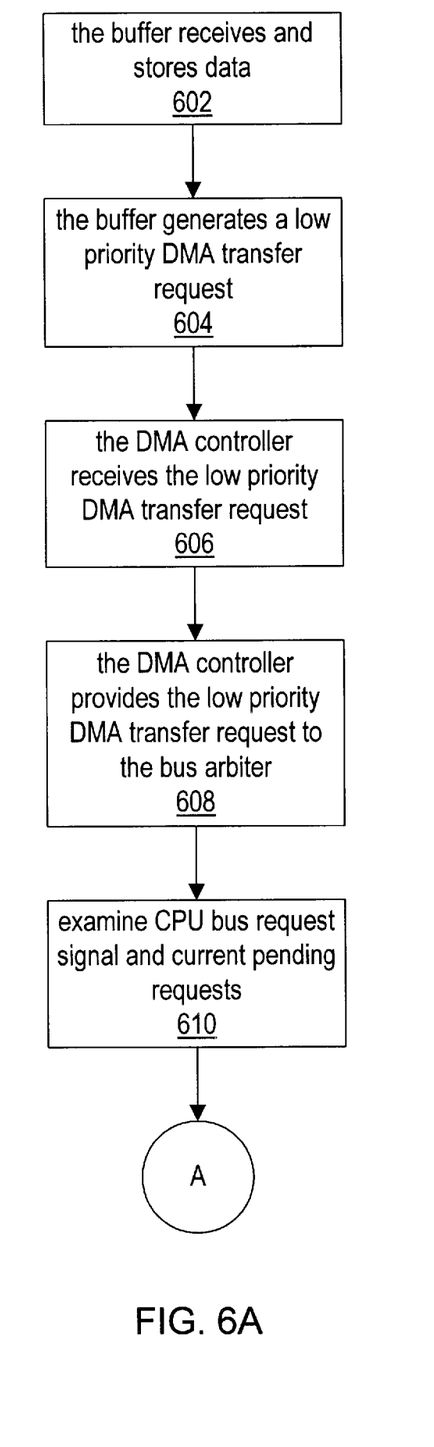
FIGS. 6A and 6B are flowchart diagrams illustrating operation of the present invention when priority DMA transfer request is received.
Figure 6B:
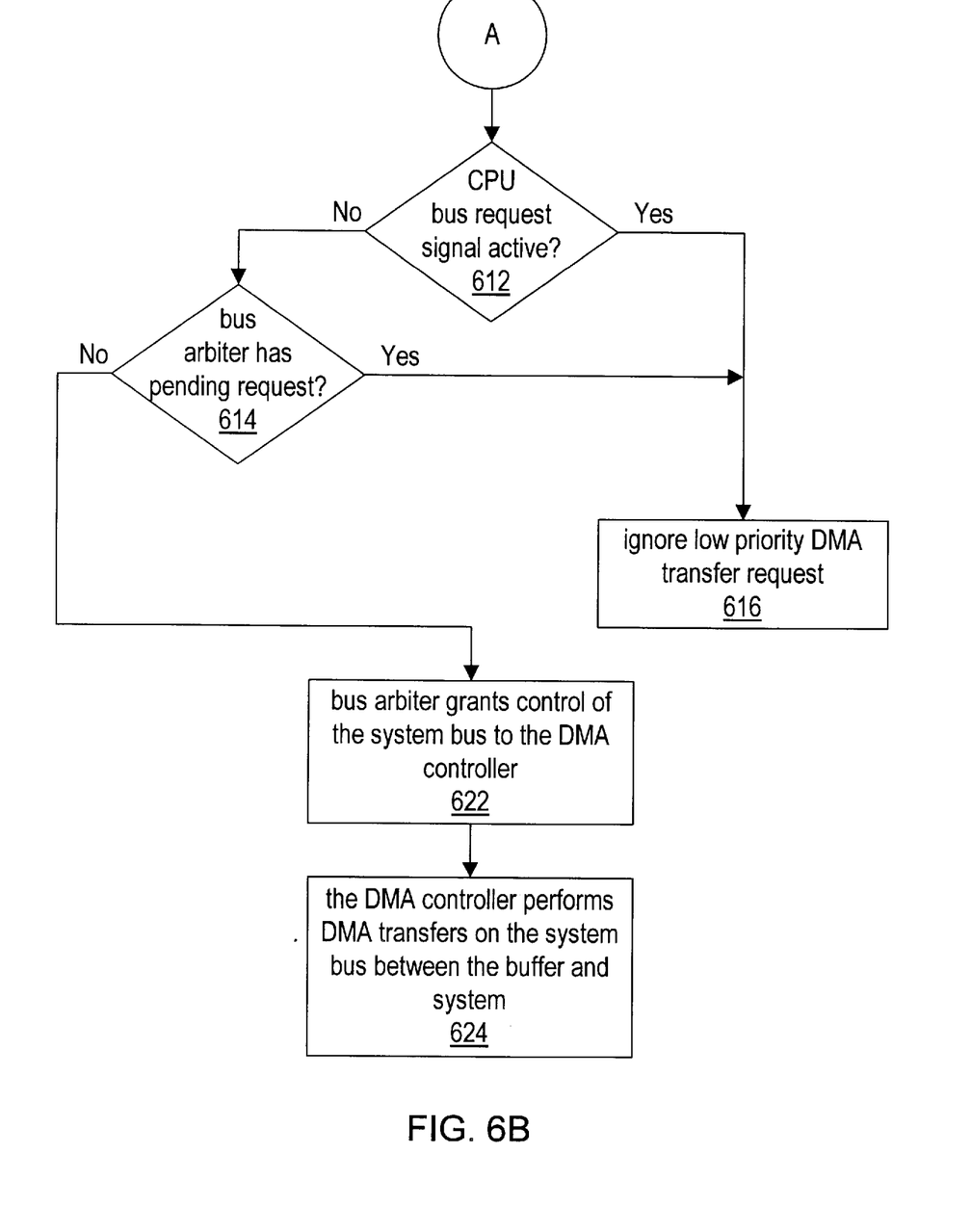

FIGS. 6A and 6B: Flowchart Diagrams-Low Priority DMA Transfer Request

Referring now to FIGS. 6A and 6B, a flowchart diagram illustrating operation of the present invention is shown. As shown, in step 602 the buffer 254 receives and stores data. As noted above, the buffer 254 is preferably adapted for receiving and storing communication data received from an external source. This data may have real time or isochronous requirements. Thus it is important that the data be processed without delays. It is noted that the buffer 254 may be adapted for storing any of various types of data.

In step 604 the buffer 254 generates a low priority DMA transfer request. The buffer 254 generates a low priority DMA transfer request in response to the buffer receiving and storing data. As noted above, the buffer 254 generates the low priority DMA transfer request in response to receiving and storing any amount of data. Alternatively, the buffer 254 generates the low priority DMA transfer request in response to receiving and storing some relatively low threshold of data.

In step 606 the direct memory access controller 222 receives the low priority DMA transfer request in response to the buffer 254 generating the low priority DMA transfer request. In step 608 the DMA controller 222 preferably provides the low priority DMA transfer request to the bus arbiter 212.

In step 610 the bus arbiter 212 examines the CPU bus request signal (BREQ) and determines if the central processing unit 202 is currently using the system bus 214. In step 610 the bus arbiter 212 also examines its currently pending bus requests that have been received by other devices.

As noted above, the CPU 202 is operable to perform transfers on the system bus 214, wherein the CPU 202 is operable to generate a bus request signal (BREQ) onto the system bus 214 to request use of the system bus 214. The bus request signal has a first state which indicates a request for use of the system bus 214, and a second state which indicates no request for use of the system bus 214. Thus the determination as to whether the CPU 202 is currently using the system bus 214 comprises examining the bus request signal and determining if the bus request signal has the second state.

Referring now to FIG. 6B, if the bus request signal (BREQ) indicates that the CPU 202 is currently using the system bus 214 as determined in step 612, and/or there are other pending bus requests as determined in step 614, then in step 616 the direct memory access controller 222 ignores the low priority DMA transfer request. In this case, the system bus 214 is not otherwise free, and thus the low priority DMA transfer request cannot be accepted.

If the bus request signal (BREQ) indicates that the CPU 202 is not currently using the system bus 214 as determined in step 612, and there are no other pending bus requests as determined in step 614, then in step 622 the bus arbiter 212 grants control of the system bus 214 to the DMA controller 222. If the CPU 202 is not currently using the system bus 214, then presumably the CPU 202 is either idle or is retrieving data from the cache system 204 without requiring access to the system bus 214.

In step 624 the direct memory access controller 222 performs DMA transfers on the system bus 214 between the buffer 254 and system memory 234. During the time that the DMA controller 222 performs DMA transfers on the system bus 214, the CPU 202 is presumable retrieving data from the cache system 204.

If the bus arbiter 212 receives a bus request from another device prior to the DMA transfers beginning, the bus arbiter 212 is preferably operable to generate a signal indicating a request for the system bus 214. The DMA controller 222 preferably does not begin the DMA transfers when the low priority DMA transfer request is received if the bus arbiter 212 generates the signal indicating another device has made a request for the system bus 214.

Figure 7:
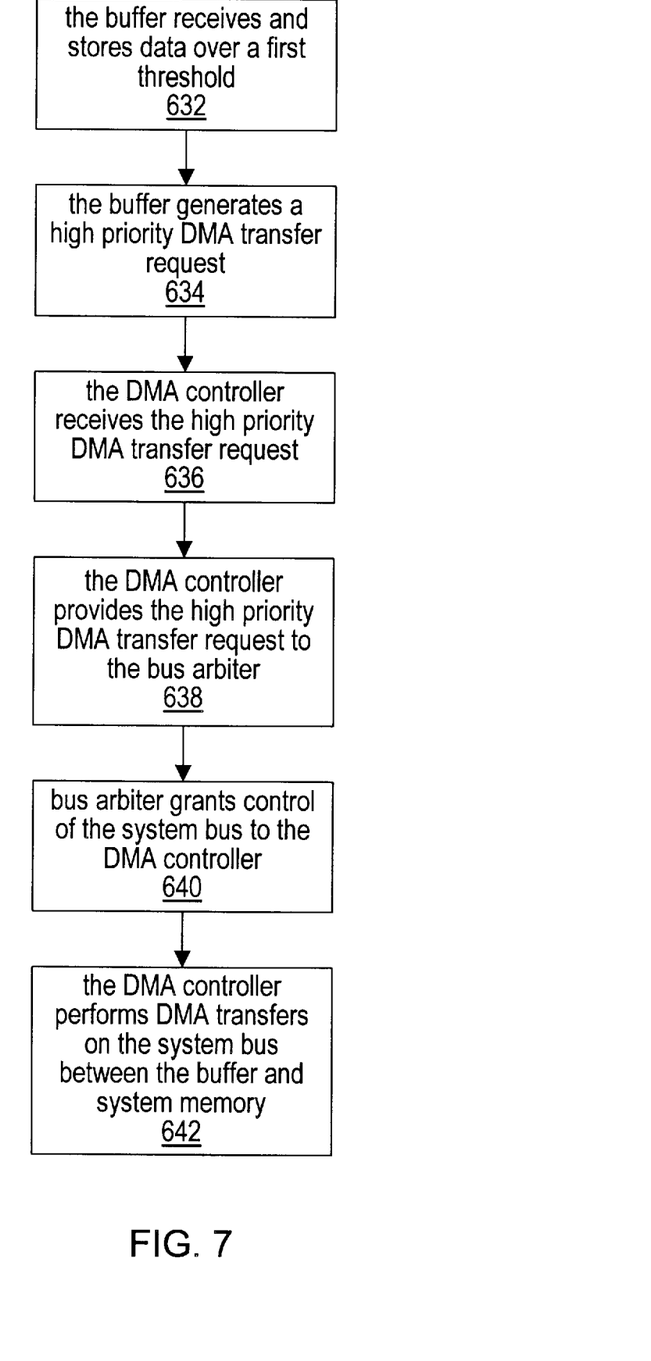
FIG. 7 is a flowchart diagram illustrating operation of the present invention when a high priority DMA transfer request is received.

FIG. 7: Flowchart Diagram-High Priority DMA Transfer Request

Referring now to FIG. 7, a flowchart diagram is shown illustrating operation of the communication system 112 when a high priority DMA transfer request is generated. As shown, in step 632 the buffer 254 receives and stores data over a first threshold. Here it is presumed that the buffer 254 has received and stored a large amount of data and thus requires a DMA transfer to avoid a FIFO overrun.

In step 634 the buffer 254 generates a high priority DMA transfer request in response to the first amount of data being stored in the buffer 254. In step 636 the DMA controller 222 receives the high priority DMA transfer request. In step 638 the DMA controller 222 provides the high priority DMA transfer request to the bus arbiter 212. In step 640 the bus arbiter 212 grants control of the system bus 214 to the DMA controller 222 in response to the high priority DMA transfer request being received. In step 642 the DMA controller 222 performs DMA transfers in response to the bus arbiter 212 granting control of the system bus 214 to the DMA controller 222.

Figure 8A:
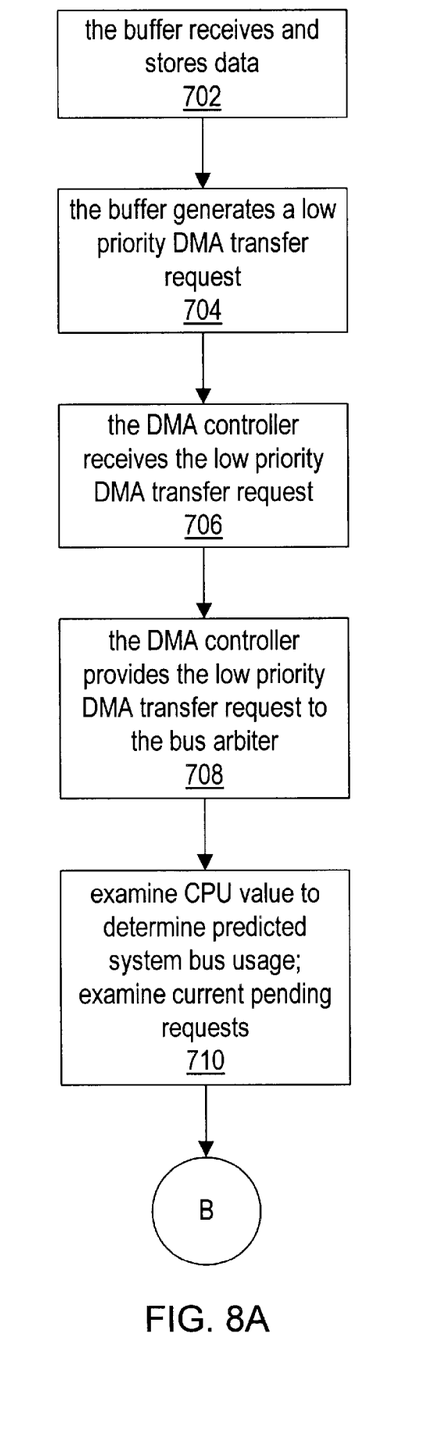
FIGS. 8A and 8B are flowchart diagrams illustrating operation of the present invention when a low priority DMA transfer request is received according to an alternate embodiment.

FIGS. 8A and 8B: Flowchart Diagrams-CPU Stores a Value Indicative of Bus Utilization Referring now to FIG. 8A, a flowchart diagram illustrating operation of the present invention according to an alternate embodiment is shown. This embodiment is similar to the embodiment of FIGS. 6A and 6B, except that the bus arbiter 212 and/or DMA controller 222 examine a value stored by the CPU 202 to determine present and predicted bus utilization, instead of examining the CPU bus request signal.

As shown, in step 702 the buffer 254 receives and stores data. As noted above, the buffer 254 is preferably adapted for receiving and storing communication data received from an external source. This data may have real time or isochronous requirements. Thus it is important that the data be processed without delays.

In step 704 the buffer 254 generates a low priority DMA transfer request. The buffer 254 generates a low priority DMA transfer request in response to the buffer receiving and storing data. As noted above, the buffer 254 generates the low priority DMA transfer request in response to receiving and storing any amount of data. Alternatively, the buffer 254 generates the low priority DMA transfer request in response to receiving and storing a first lower threshold of data.

In step 706 the direct memory access controller 222 receives the low priority DMA transfer request in response to the buffer 254 generating the low priority DMA transfer request. In step 708 the DMA controller 222 preferably provides the low priority DMA transfer request to the bus arbiter 212.

In step 710 the bus arbiter 212 examines a value stored by the CPU which indicates the CPU's predicted future usage of the system bus 214. As noted above, this value is preferably generated by the CPU bus interface unit (BIU)

logic based on available information, such as the current instructions in the CPU pipeline and the possibility of future cache hits. In step 710 the bus arbiter 212 also examines its current pending requests.

Figure 8B:
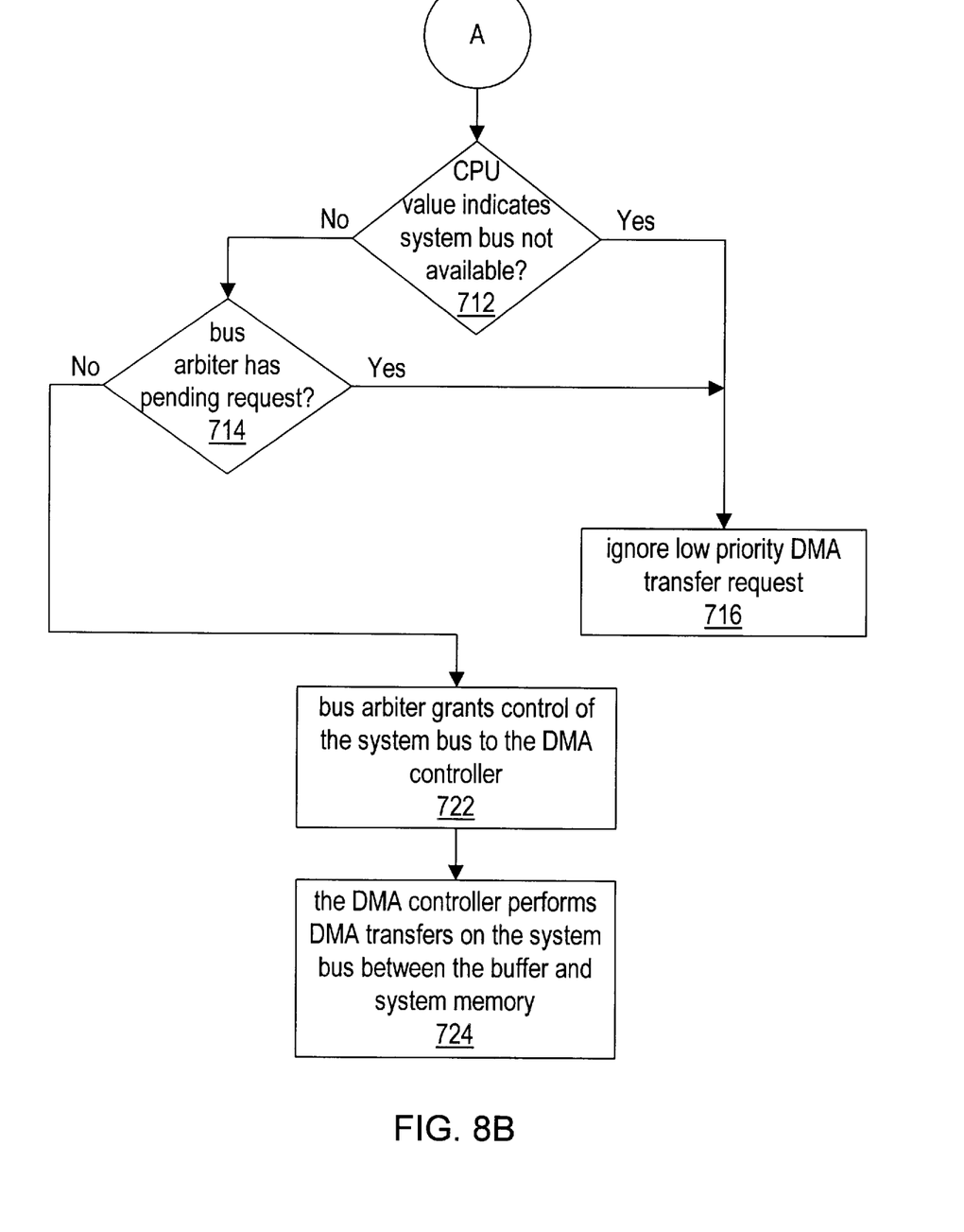

Referring now to FIG. 8B, if the value stored by the CPU indicates that the CPU 202 will be using the system bus 214 for a certain period as determined in step 712, and/or if the bus arbiter 212 has pending requests as determined in step 714, then in step 716 the direct memory access controller 222 ignores the low priority DMA transfer request. In this case, the system bus 214 is not otherwise free, and thus the low priority DMA transfer request cannot be accepted.

If the value stored by the CPU indicates that the CPU 202 will not be using the system bus 214 for a certain period as determined in step 712, and if the bus arbiter 212 has no pending requests as determined in step 714, then in step 722 the bus arbiter 212 grants control of the system bus 214 to the DMA controller 222. If the CPU 202 is not currently using the system bus 214, then presumably the CPU 202 is either idle or is retrieving data from the cache system 204 without requiring access to the system bus 214.

In step 724 the direct memory access controller 222 performs DMA transfers on the system bus 214 between the buffer 254 and system memory 234. During the time that the DMA controller 222 performs DMA transfers on the system bus 214, the CPU 202 is presumable retrieving data from the cache system 204.

If the bus arbiter 212 receives a bus request from another device prior to the DMA transfers beginning, the bus arbiter 212 is preferably operable to generate a signal indicating a request for the system bus 214. The DMA controller 222 preferably does not begin the DMA transfers when the low priority DMA transfer request is received if the bus arbiter 212 generates the signal indicating a request for the system bus 214.

CONCLUSION

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A system for optimizing bus bandwidth in a data processing system, comprising:
   a system bus for transferring data;
   a memory coupled to the system bus;
   a central processing unit coupled to the system bus, wherein the CPU is operable to perform transfers on the system bus, wherein the CPU is operable to generate a bus request signal onto the system bus to request use of the system bus, wherein the bus request signal has a first state which indicates a request for use of the system bus, and a second state which indicates no request for use of the system bus;
   a cache system coupled to the system CPU and coupled to the bus, wherein the cache system stores data which is usable by the CPU;
   wherein the CPU is operable to retrieve data from the cache system without requiring access to the system bus, wherein the system bus request signal has said second state while the CPU is retrieving data from the cache system;
   a buffer coupled to the system bus which stores data, wherein the buffer is operable to generate a low priority DMA transfer request when data is stored in the buffer, is less than or equal to a threshold wherein the buffer is operable to generate a high priority DMA transfer request when an amount of data is stored in the buffer is greater than said threshold;
   a direct memory access controller which is operable to perform direct memory access transfers on the system bus between a requesting device and the memory, wherein the direct memory access controller performs the DMA transfers in response to direct memory access requests from the requesting devices, wherein the direct memory access controller includes one or more inputs which receive the high priority DMA transfer request and the low priority DMA transfer request, wherein when the high priority DMA transfer request is received the direct memory access controller is operable to initiate a DMA transfer request, wherein when the low priority DMA transfer request is received, the direct memory access controller is operable to initiate a DMA transfer request only if the bus request signal is in said second state.

2. The system of claim 1, wherein the direct memory access controller is operable to perform DMA transfers when the low priority DMA transfer request is received only if the bus request signal is in said second state and the system bus is not currently busy with data transfers.

3. The system of claim 2, wherein the direct memory access controller is operable to receive a signal indicating a request for the system bus, wherein the direct memory access controller is configured to not perform DMA transfers when the low priority DMA transfer request is received if said signal indicating a request for the system bus is received.

4. The system of claim 2, wherein the DMA controller is operable in a block mode, wherein DMA transfers are not performed in response to said low priority DMA transfer request if said DMA controller is operating in said block mode.

5. The system of claim 1, further comprising:
   a bus arbiter coupled to the direct memory access controller, wherein the bus arbiter is operable to control access to the system bus;
   wherein the direct memory access controller is operable to provide said high priority DMA transfer request and said low priority DMA transfer request to the bus arbiter;
   wherein the bus arbiter is operable to grant control of the system bus for a DMA transfer when the high priority DMA transfer request is received, wherein the bus arbiter is operable to grant control of the system bus for a DMA transfer when the low priority DMA transfer request is received only if the bus request signal is in said second state.

6. The system of claim 5, wherein the bus arbiter is operable to grant control of the system bus for a DMA transfer when the low priority DMA transfer request is received only if the bus request signal is in said second state and the arbiter is not currently busy with data transfers.

7. The system of claim 5, wherein the bus arbiter is operable to grant control of the system bus for a DMA transfer when the low priority DMA transfer request is received only if the bus request signal is in said second state and no other requests are pending with the arbiter.

8. The system of claim 5, wherein the bus arbiter is operable to generate a signal indicating a request for the system bus, wherein the direct memory access controller is configured to not perform DMA transfers when the low priority DMA transfer request is received by the direct memory access controller if said signal indicating a request for the system bus is received by the direct memory access controller.

9. The system of claim 1, wherein the buffer is a receive buffer for storing received communication data.

10. The system of claim 1, wherein the buffer is an Ethernet buffer for storing Ethernet data.

11. The system of claim 1, wherein the central processing unit includes a bus interface unit, wherein the bus interface unit stores a value which indicates predicted future CPU usage of the system bus;

wherein the direct memory access controller is operable to read said value which indicates predicted future CPU usage of the system bus prior to performing DMA transfers, wherein the direct memory access controller performs DMA transfers for a length of time based on said value.

12. A method for performing transfers in a communication system, wherein the communication system comprises a system bus for transferring data, a central processing unit coupled to the system bus a system memory coupled to the system bus, a cache system coupled to the CPU and coupled to the bus, a buffer coupled to the system bus which stores data, and a direct memory access controller coupled to the system bus, the method comprising:

the buffer receiving and storing data;

the buffer generating a low priority DMA transfer request, wherein the buffer generating a low priority DMA transfer request is performed in response to the buffer receiving and storing data is less than or equal to a threshold;

the direct memory access controller receiving the low priority DMA transfer request in response to the buffer generating the low priority DMA transfer request;

determining if the central processing unit is currently using the system bus in response to the buffer generating the low priority DMA transfer request; and the direct memory access controller performing DMA transfers on the system bus between the buffer and system memory in response to the buffer generating the low priority DMA transfer request and the determining that the central processing unit is not currently using the system bus.

13. The method of claim 12, further comprising:

the CPU retrieving data from the cache system without requiring access to the system bus, wherein the CPU retrieving data from the cache system occurs during the direct memory access controller performing DMA transfers on the system bus between the buffer and system memory.

14. The method of claim 13, wherein the CPU retrieving data from the cache system occurs during said determining if the central processing unit is currently using the system bus.

15. The method of claim 12, wherein the CPU is operable to perform transfers on the bus, wherein the CPU is operable to generate a bus request signal onto the bus to request use of the bus, wherein the bus request signal has a first state which indicates a request for use of the system bus, and a second state which indicates no request for use of the system bus, wherein said determining if the central processing unit is currently using the system bus comprises examining said bus request signal and determining if said bus request signal has said second state;

wherein the direct memory access controller performs DMA transfers on the system bus between the buffer and system memory in response to the buffer generating the low priority DMA transfer request and the determining that said bus request signal has said second state.

16. The method of claim 12, further comprising:

determining if transfers are not currently occurring on the system bus in response to the buffer generating the low priority DMA transfer request;

wherein the direct memory access controller performing DMA transfers on the system bus between the buffer and system memory is not performed if transfers are currently occurring on the system bus.

17. The method of claim 12, further comprising:

the buffer generating a high priority DMA transfer request when an amount of data is stored in the buffer is greater than said threshold;

the direct memory access controller receiving the high priority DMA transfer request;

the direct memory access controller performing DMA transfers in response to the direct memory access controller receiving the high priority DMA transfer request.

18. The method of claim 12, wherein the buffer generating a low priority DMA transfer request is performed in response to the buffer receiving and storing any amount of data.

19. The method of claim 12, wherein the communication system further comprises a bus arbiter coupled to the system bus, wherein the bus arbiter is operable to grant control of the system bus to a requesting device, the method further comprising:

the direct memory access controller providing said low priority DMA transfer request to the bus arbiter;

the bus arbiter determining if the central processing unit is currently using the system bus in response to the direct memory access controller providing said low priority DMA transfer request to the bus arbiter;

the bus arbiter granting control of the system bus for a DMA transfer in response to the direct memory access controller providing said low priority DMA transfer request to the bus arbiter and the bus arbiter determining that the central processing unit is not currently using the system bus.

20. The method of claim 19, wherein the CPU is operable to perform transfers on the bus, wherein the CPU is operable to generate a bus request signal onto the bus to request use of the bus, wherein the bus request signal has a first state which indicates a request for use of the system bus, and a second state which indicates no request for use of the system bus, wherein the bus arbiter granting control of the system bus for a DMA transfer when the low priority DMA transfer request is received is performed only if the bus request signal is in said second state and the arbiter is not currently busy with data transfers.

21. The method of claim 20, wherein the bus arbiter granting control of the system bus for a DMA transfer when the low priority DMA transfer request is received is performed only if the bus request signal is in said second state and no other requests are pending with the arbiter.

22. The method of claim 19, further comprising:

the bus arbiter generating a signal indicating a request for the system bus;

wherein the direct memory access controller does not perform DMA transfers when the low priority DMA transfer request is received if the bus arbiter generates said signal indicating a request for the system bus.

* * * * *